United States Patent
Abari

(10) Patent No.: US 11,237,268 B2
(45) Date of Patent: Feb. 1, 2022

(54) TUNABLE LIDAR FOR SIMULTANEOUS RANGING AND ENVIRONMENTAL MONITORING

(71) Applicant: Lyft, Inc., San Francisco, CA (US)

(72) Inventor: Farzad Cyrus Foroughi Abari, San Bruno, CA (US)

(73) Assignee: Lyft, Inc., San Francisco, CA (US)

( * ) Notice: Subject to any disclaimer, the term of this patent is extended or adjusted under 35 U.S.C. 154(b) by 582 days.

(21) Appl. No.: 16/048,079

(22) Filed: Jul. 27, 2018

(65) Prior Publication Data
US 2020/0033476 A1   Jan. 30, 2020

(51) Int. Cl.
| | |
|---|---|
| *G01S 17/87* | (2020.01) |
| *G01S 17/42* | (2006.01) |
| *G01C 21/30* | (2006.01) |
| *G01N 15/14* | (2006.01) |

(52) U.S. Cl.
CPC .............. *G01S 17/87* (2013.01); *G01C 21/30* (2013.01); *G01N 15/1434* (2013.01); *G01S 17/42* (2013.01); *G01N 2015/1493* (2013.01)

(58) Field of Classification Search
CPC .......... G01S 17/42; G01S 17/87; G01S 17/66; G01S 17/88; G01S 17/89; G01S 17/894; G08G 5/0013; G08G 5/003; G06K 9/0063; G01N 33/0073; G01N 15/1434; G01N 2015/1493; G05D 1/0022; G05D 1/106;

(Continued)

(56) References Cited

U.S. PATENT DOCUMENTS

| | | | | |
|---|---|---|---|---|
| 4,552,456 A | * | 11/1985 | Endo | G01C 3/08 |
| 4,634,272 A | * | 1/1987 | Endo | G01C 3/08 |
| 4,818,887 A | * | 4/1989 | Weishaupt et al. | G01N 21/86 |
| 5,298,905 A | * | 5/1994 | Dahl | G01S 13/86 |
| 5,805,283 A | * | 9/1998 | Ludman et al. | G01B 9/02 |
| 6,593,582 B2 | * | 7/2003 | Lee et al. | G01N 21/17 |
| 7,741,618 B2 | * | 6/2010 | Lee et al. | G01J 1/58 |
| 7,746,449 B2 | * | 6/2010 | Ray et al. | G01C 3/08 |

(Continued)

OTHER PUBLICATIONS

"World Defense News: Acmat light tactical vehicles for medical support and ambulance on the battlefield" [online] [posted on Apr. 14, 2012] [archived on Jul. 16, 2012] [retrieved on Oct. 29, 2020] <URL: worlddefencenews.blogspot.com/2012/04/acmat-light-tactical-vehicles-for.html> <URL: web.archive.org>. (Year: 2012).*

(Continued)

*Primary Examiner* — Luke D Ratcliffe
(74) *Attorney, Agent, or Firm* — Baker Botts L.L.P.

(57) ABSTRACT

In one embodiment, a method includes emitting, by an automotive vehicle, one or more light beams from a LiDAR system toward an environment surrounding the automotive vehicle, receiving one or more return light beams at the LiDAR system of the automotive vehicle, detecting one or more objects located in the environment surrounding the automotive vehicle based on the return light beams, and simultaneously measuring one or more air characteristics of the environment surrounding the automotive vehicle. The simultaneous detecting of the one or more objects and measuring of the one or more air characteristics may be performed by the LiDAR system. The method may further include sending, by the automotive vehicle, location information to a server associated with vehicle navigation, and sending information of the detected objects and measured air characteristics to the server associated with vehicle navigation, the server configured to update a vehicle-navigation map based on the information.

20 Claims, 8 Drawing Sheets

(58) Field of Classification Search
CPC ............... G05D 1/0094; B64C 39/024; B64C 2201/123; G01C 21/30
See application file for complete search history.

(56) References Cited

U.S. PATENT DOCUMENTS

| | | | | |
|---|---|---|---|---|
| 9,360,554 | B2* | 6/2016 | Retterath et al. | G01S 17/89 |
| 9,518,830 | B1* | 12/2016 | Breed | G01C 21/30 |
| 9,677,893 | B2* | 6/2017 | Breed | G08G 1/0962 |
| 9,766,336 | B2* | 9/2017 | Gupta et al. | G01S 17/936 |
| 9,784,560 | B2* | 10/2017 | Thorpe et al. | G01B 9/02007 |
| 2007/0040121 | A1* | 2/2007 | Kalayeh | G01S 17/86 250/342 |
| 2016/0084945 | A1* | 3/2016 | Rodrigo | G01S 17/95 356/5.01 |
| 2016/0259038 | A1* | 9/2016 | Retterath et al. | G01S 7/4802 |
| 2016/0356881 | A1* | 12/2016 | Retterath et al. | G01S 7/4863 |
| 2017/0336320 | A1* | 11/2017 | Yalin | G01N 21/3504 |
| 2018/0181131 | A1* | 6/2018 | Huang | G05D 1/024 |
| 2018/0210083 | A1* | 7/2018 | Fasching et al. | G01S 17/026 |

OTHER PUBLICATIONS

Iseki, T.; Tai, H.; Kimura, K. "A portable remote methane sensor using a tunable diode laser." Measurement Science & Technology 11.6:594-602. IOP Publishing. (Jun. 2000). (Year: 2000).*

Mitchell, David; Duffin, Kevin; Johnstone, Walter; "Remote methane sensor using tunable diode laser spectroscopy (TDLS) via a 1 W Raman source." Proceedings of the SPIE—The International Society for Optical Engineering 7503: 750350 (4). SPIE (2009). (Year: 2009).*

Cao Jia-nian; Zhang Ke-ke; Wang Zhuo; Yang Rui; Wang Yong. "Optic fiber methane gas sensor based on tunable diode laser absorption spectroscopy." Proceedings 2010 Symposium on Photonics and Optoelectronics (SOPO 2010): 5. IEEE (2010). (Year: 2010).*

Shemshad, Javad. "Design of a fibre optic sequential multipoint sensor for methane detection using a single tunable diode laser near 1666nm." Sensors and Actuators: B Chemical 186: 466-77. Elsevier Sequoia S.A. (Sep. 2013). (Year: 2013).*

Nwaboh, Javis Anyangwe; Pratzler, Sonja; Werhahn, Olav; Ebert, Volker; "Tunable Diode Laser Absorption Spectroscopy Sensor for Calibration Free Humidity Measurements in Pure Methane and Low $CO_2$ Natural Gas." Applied Spectroscopy 71.5: 888-900. SAGE Publications (May 2017). (Year: 2017).*

Sallis, Philip, et al. "Air pollution and fog detection through vehicular sensors." 2014 8th Asia Modelling Symposium. IEEE, 2014. (Year: 2014).*

Lv, Lihui, et al. "Application of mobile vehicle lidar for urban air pollution monitoring." Chinese Optics Letters 14.6 (2016): 060101. (Year: 2016).*

* cited by examiner

TUNABLE LIDAR FOR SIMULTANEOUS RANGING AND ENVIRONMENTAL MONITORING

BACKGROUND

Light Detection and Ranging (LiDAR) is a sensing method that uses a light beam to measure the distance to various objects. A LiDAR sensor works by emitting a light beam and measuring the time it takes to return. The return time for each return light beam is combined with the location of the LiDAR sensor to determine a precise location of a surface point of an object, and this location is recorded as a three-dimensional point in space.

Autonomous vehicles typically use a LiDAR sensor to obtain depth profiles of the environment to help navigate the vehicle around the environment. However, the presence of various trace gases and aerosol particles (e.g., the aerosol particles responsible for pollution) in the air may affect the sensitivity of LiDAR measurements. In addition, information on the type and amount of each of the various trace gases and aerosol particles in the air may be useful for user experience and satisfaction in the context of ride services provided to users.

DESCRIPTION OF EXAMPLE EMBODIMENTS

Figure 1:
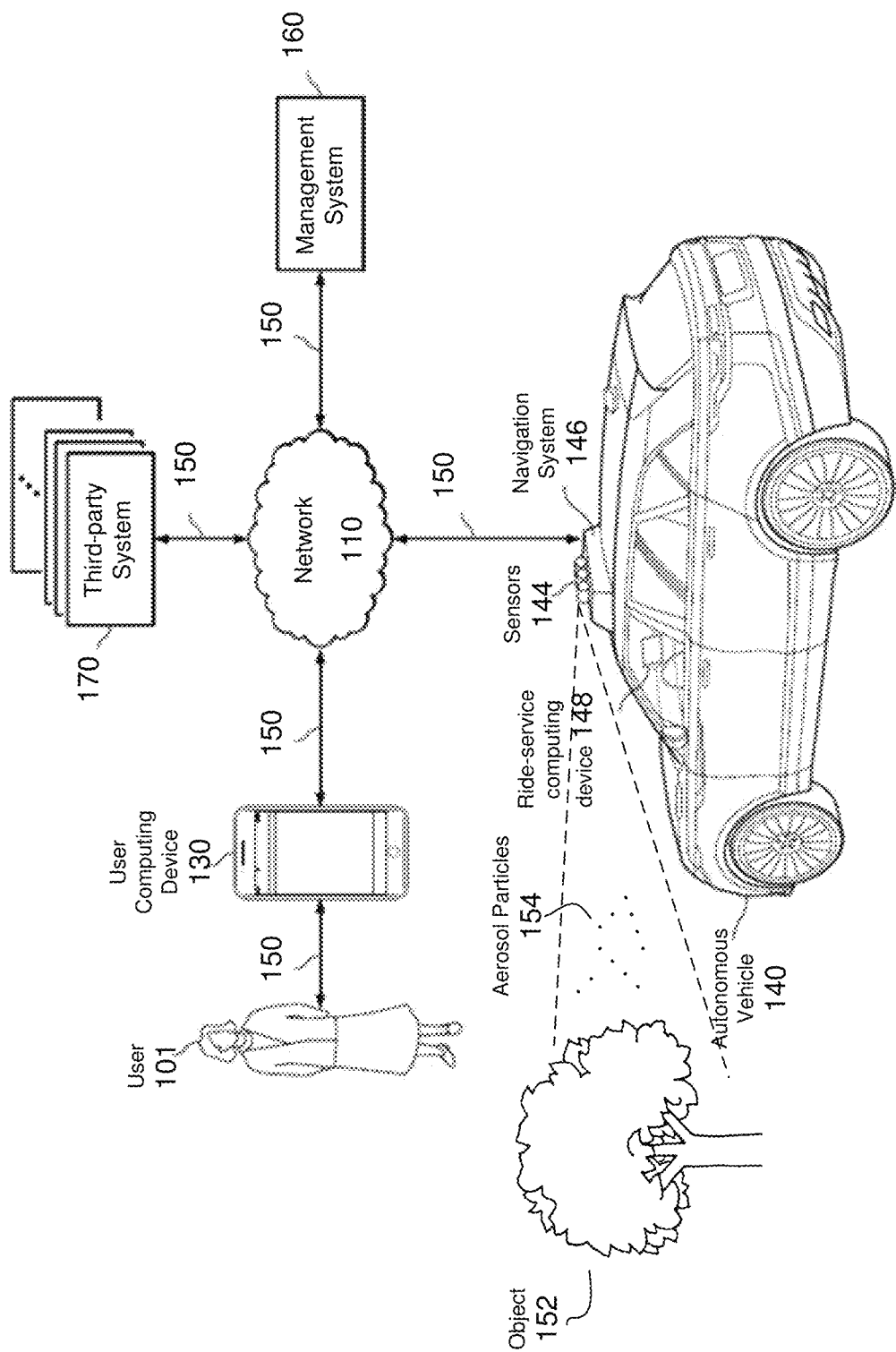
FIG. 1 illustrates an example block diagram of a transportation management environment with a tunable LiDAR system mounted on a vehicle and being used to obtain depth profile information and aerosol particle information.

Transportation management technology for "smart" vehicles may be used for intelligent transportation and user interaction to help optimize vehicle safety, driver and passenger safety, efficiency, and user-friendliness. A vehicle may use various devices and sensors (e.g., LiDAR, cameras, etc.) to sense its environment and navigate around this environment with little to no human input. In a manually-driven vehicle, these devices and sensors may assist the vehicle operator to operate the vehicle more safely and efficiently, for example, by using object warning detection indicators, optimizing speed for fuel economy, detecting lane markers and changes, avoiding or minimizing collisions, navigating around air pollutants, and/or deploying other relevant vehicle monitoring or maneuvers. In addition, these devices may help take most or full control of vehicle operation from the vehicle operator under some or all circumstances when the transportation management technology is able to recognize a dangerous or risky situation and steer or control the vehicle to avoid or mitigate the situation.

In the case of autonomous vehicles, a vehicle may be equipped with a variety of systems or modules for enabling it to determine its surroundings and safely and automatically navigate to target destinations. For example, an autonomous vehicle may have an integrated computing system (e.g., one or more central processing units, graphical processing units, memory, and storage) for controlling various operations of the vehicle, such as driving and navigating. To that end, the computing system may process data from one or more sensor arrays. For example, an autonomous vehicle may have optical cameras for, e.g., recognizing roads and lane markings, and objects on the road; LiDARs for, e.g., detecting 360° surroundings; sensor for detecting trace gases and aerosol particles or pollutants in the air; infrared cameras for, e.g., night vision; radio detection and ranging (RADAR) for, e.g., detecting distant hazards; stereo vision for, e.g., spotting hazards such as pedestrians or tree branches; wheel sensors for, e.g., measuring velocity; ultra sound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by a navigation system to detect objects in the vehicle's pathway and safely guide the vehicle, even without the aid of a human driver. The autonomous vehicle may also include communication devices for, e.g., wirelessly communicating with one or more servers, user devices (e.g., smartphones, tablet computers, smart wearable devices, laptop computers) and/or other vehicles.

Successful and safe navigation of a vehicle depends on having accurate data measurement and representation of the external environment at all times. In particular embodiments, a tunable LiDAR system may be used for both object detection and trace gas and aerosol particle mapping. Traditionally, LiDAR uses a light beam to measure the distance to various objects in the external environment. However, the traditional LiDAR system may not be able collect other information from the external environment such as aerosol particle density information, temperature information, and other relevant information that may be useful for navigating the vehicle. In particular embodiment, a tunable LiDAR may include one or more lasers configured to measure a number density of various gases in the atmosphere for high resolution mapping of these gases. As an example, the existing LiDAR system may be modified to include at least two lasers that are positioned in very close proximity to each other that use at least two different wavelengths in order measure a number density of various gases (e.g., methane, water vapor, etc.). This LiDAR system may be "tunable," or selectable for one or more of the various gases, which may be selected by the driver or passenger, or selected by the autonomous vehicle for mapping of these gases.

In particular embodiments, the tunable LiDAR system may detect and measure trace gases using spectroscopy. As an example and not by way of limitation, the tunable LiDAR system may be composed of at least two lasers with wavelengths that are very close to each other. The two lasers may be close enough in proximity such that a backscatter coefficient for the wavelengths associated with each of the lasers are almost identical to each other. In particular embodiments, the wavelength associated with a first laser maybe tuned to an absorption band of the trace gas of interest (e.g., methane), while the wavelength associated with a second laser is tuned to a different wavelength (e.g., a wavelength that experiences much less absorption compared to the wavelength of the first laser). As an example and not by way of limitation, trace gases of interest include methane ($CH_4$), water vapor, carbon dioxide ($CO_2$), nitrous oxide ($N_2O$), and any other relevant trace gases that exist in the spectral band spanning from visible light (e.g., from about 390 nm to 700 nm) all the way to around 2000 nm.

In particular embodiments, the tunable LiDAR system may detect and characterize the aerosol particles responsible for pollution by characterizing the reflected power from the aerosol particles. As an example and not by way of limitation, a tunable LiDAR may have a plurality of lasers set to at least two or three wavelengths that are all different from each other.

In the context of manually-driven vehicles, the trace gas and aerosol particle mapping feature may be useful in detecting a variety of trace gases and aerosol particles and then providing the driver with information on air quality and potentially-hazardous situations that the driver may want to avoid. As an example, if information is available regarding smog or other atmospheric pollutants along a travel route, the driver of the vehicle may want to take an alternative route to bypass the smog and atmospheric pollutants. In addition, in the context of autonomous vehicles, the trace gas and aerosol particle mapping feature may be useful for detecting a variety of trace gases and aerosol particles, and then the autonomous vehicle may use this information to automatically update or revise a selected route based on any potentially-hazardous situations that the passenger may want to avoid. In addition, a fleet of autonomous vehicles may be used for the detection process. For example, different vehicles may be used for detecting different trace gases and aerosol particles in a particular area (e.g., different vehicles in the same area can select different wavelengths for detecting different trace gases and aerosol particles) in order to collect the most information on a wide variety of trace gases and aerosol particles in the area. In addition, after various trace gases and aerosol particles are detected by the fleet of vehicles, this information may then be shared by all the vehicles in the fleet so that routing decisions for any particular vehicle may be updated based on the detection of particular trace gases or aerosol particles (e.g., pollution) on a particular day for a particular route.

In particular embodiments, this tunable LiDAR system may be further modified to include a third laser that uses a third wavelength in order to detect temperature. Absorption of light is a function of a number density of molecules in the air and also the temperature of the air, and thus adding a third laser would result in a LiDAR system that can simultaneous conduct object detection, trace gas and aerosol particle mapping, and also temperature mapping. This detection of temperature may also help improve object detection due to the effect of temperature on the reflectivity of an object. As an example, the tunable LiDAR system may be able to use the temperature information to calibrate the reflectivity of the object in order to better detect and identify the object.

In the context of manually-driven vehicles, this tunable LiDAR system with temperature detection in addition to trace gas and aerosol particle mapping may provide temperature mapping useful for solar production scenarios and providing the driver with information on potentially-hazardous temperature situations that the driver may want to avoid. In addition, in the context of autonomous vehicles, the autonomous vehicle that may use the temperature-mapping information to automatically update or revise a selected route based on any potentially-hazardous situations that the passenger may want to avoid.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates an example block diagram of a transportation management environment with a tunable LiDAR system 100 mounted on a vehicle and being used to obtain depth profile information and trace gas and aerosol particle information. In particular embodiments, the environment may include various computing entities, such as a user computing device 130 of a user 101 (e.g., a ride provider or requestor), a transportation management system 160, an autonomous vehicle 140, and one or more third-party system 170. The computing entities may be communicatively connected over any suitable network 110. As an example and not by way of limitation, one or more portions of network 110 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 1 illustrates a single user device 130, a single transportation management system 160, a single vehicle 140, a plurality of third-party systems 170, and a single network 110, this disclosure contemplates any suitable number of each of these entities. As an example and not by way of limitation, the network environment may include multiple users 101, user devices 130, transportation management systems 160, autonomous-vehicles 140, third-party systems 170, and networks 110.

The user device 130, transportation management system 160, autonomous vehicle 140, and third-party system 170 may be communicatively connected or co-located with each other in whole or in part. These computing entities may communicate via different transmission technologies and network types. For example, the user device 130 and the vehicle 140 may communicate with each other via a cable or short-range wireless communication (e.g., Bluetooth, NFC, WI-FI, etc.), and together they may be connected to the Internet via a cellular network that is accessible to either one of the devices (e.g., the user device 130 may be a smartphone with LTE connection). The transportation management system 160 and third-party system 170, on the other hand, may be connected to the Internet via their respective LAN/WLAN networks and Internet Service Providers (ISP). FIG. 1 illustrates transmission links 150 that connect user device 130, autonomous vehicle 140, transportation management system 160, and third-party system 170 to communication network 110. This disclosure contemplates any suitable transmission links 150, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 150 may connect to one or more networks 110, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 150. For example, the user device 130 may communicate with the transportation management system via a cellular network and the Internet, but communicate with the autonomous vehicle 140 via Bluetooth or a physical wire connection.

In particular embodiments, the transportation management system 160 may fulfill ride requests for one or more users 101 by dispatching suitable vehicles. The transportation management system 160 may receive any number of ride requests from any number of ride requestors 101. In particular embodiments, a ride request from a ride requestor 101 may include an identifier that identifies the ride requestor in the system 160. The transportation management system 160 may use the identifier to access and store the ride requestor's 101 information, in accordance with the requestor's 101 privacy settings. The ride requestor's 101 information may be stored in one or more data stores (e.g., a relational database system) associated with and accessible to the transportation management system 160. In particular embodiments, ride requestor information may include profile information about a particular ride requestor 101. In particular embodiments, the ride requestor 101 may be associated with one or more categories or types, through which the ride requestor 101 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 160 may classify a user 101 based on known information about the user 101 (e.g., using machine-learning classifiers), and use the classification to retrieve relevant aggregate information associated with that class. For example, the system 160 may classify a user 101 as a young adult and retrieve relevant aggregate information associated with young adults, such as the type of music generally preferred by young adults.

Transportation management system 160 may also store and access ride information. Ride information may include locations related to the ride, traffic data, route options, optimal pick-up or drop-off locations for the ride, or any other suitable information associated with a ride. As an example and not by way of limitation, when the transportation management system 160 receives a request to travel from San Francisco International Airport (SFO) to Palo Alto, Calif., the system 160 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 160. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 160. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 160 in particular embodiments may predict and provide ride suggestions in response to a ride request. In particular embodiments, the system 160 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 160 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 160 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 130 (which may belong to a ride requestor or provider), a transportation management system 160, vehicle system 140, or a third-party system 170 to process, transform, manage, retrieve, modify, add, or delete the information stored in the data store.

In particular embodiments, transportation management system 160 may include an authorization server (or any other suitable component(s)) that allows users 101 to opt-in to or opt-out of having their information and actions logged, recorded, or sensed by transportation management system 160 or shared with other systems (e.g., third-party systems 170). In particular embodiments, a user 101 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 101 of transportation management system 160 through blocking, data hashing, anonymization, or other suitable techniques as appropriate.

In particular embodiments, third-party system 170 may be a network-addressable computing system that may provide HD maps or host GPS maps, customer reviews, music or content, weather information, or any other suitable type of information. Third-party system 170 may generate, store, receive, and send relevant data, such as, for example, map data, customer review data from a customer review website, weather data, or any other suitable type of data. Third-party system 170 may be accessed by the other computing entities of the network environment either directly or via network 110. For example, user device 130 may access the third-party system 170 via network 110, or via transportation management system 160. In the latter case, if credentials are required to access the third-party system 170, the user 101 may provide such information to the transportation management system 160, which may serve as a proxy for accessing content from the third-party system 170.

In particular embodiments, user device 130 may be a mobile computing device such as a smartphone, tablet computer, or laptop computer. User device 130 may include one or more processors (e.g., CPU and/or GPU), memory, and storage. An operating system and applications may be installed on the user device 130, such as, e.g., a transportation application associated with the transportation management system 160, applications associated with third-party systems 170, and applications associated with the operating system. User device 130 may include functionality for determining its location, direction, or orientation, based on integrated sensors such as GPS, compass, gyroscope, or accelerometer. User device 130 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 130 may also include one or more cameras, scanners, touchscreens, microphones, speakers, and any other suitable input-output devices.

In particular embodiments, the vehicle 140 may be an autonomous vehicle and equipped with an array of sensors 144, a navigation system 146, and a ride-service computing device 148. In particular embodiments, a fleet of autonomous vehicles 140 may be managed by the transportation management system 160. The fleet of autonomous vehicles 140, in whole or in part, may be owned by the entity associated with the transportation management system 160, or they may be owned by a third-party entity relative to the transportation management system 160. In either case, the transportation management system 160 may control the operations of the autonomous vehicles 140, including, e.g., dispatching select vehicles 140 to fulfill ride requests, instructing the vehicles 140 to perform select operations (e.g., head to a service center or charging/fueling station, pull over, stop immediately, self-diagnose, lock/unlock compartments, change music station, change temperature, and any other suitable operations), and instructing the vehicles 140 to enter select operation modes (e.g., operate normally, drive at a reduced speed, drive under the command of human operators, and any other suitable operational modes).

In particular embodiments, the autonomous vehicles 140 may receive data from and transmit data to the transportation management system 160 and the third-party system 170. Example of received data may include, e.g., instructions, new software or software updates, maps, 3D models, trained or untrained machine-learning models, depth profile information, trace gas and aerosol particle information location information (e.g., location of the ride requestor, the autonomous vehicle 140 itself, other autonomous vehicles 140, and target destinations such as service centers), navigation information, traffic information, weather information, entertainment content (e.g., music, video, and news) ride requestor information, ride information, and any other suitable information. Examples of data transmitted from the autonomous vehicle 140 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 140, passengers may send/receive data to the transportation management system 160 and/or third-party system 170), and any other suitable data.

In particular embodiments, autonomous vehicles 140 may also communicate with each other as well as other traditional human-driven vehicles, including those managed and not managed by the transportation management system 160. For example, one vehicle 140 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 160 or third-party system 170).

In particular embodiments, an autonomous vehicle 140 may obtain and process sensor/telemetry data. Such data may be captured by any suitable sensors. For example, the vehicle 140 may have a Light Detection and Ranging (LiDAR) sensor array of multiple LiDAR transceivers that are configured to rotate 360°, emitting pulsed laser light and measuring the reflected light from objects surrounding vehicle 140. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 140. As an example and not by way of limitation, the 3D model may represent the external environment including objects 152 such as trees, other cars, curbs, debris, objects, and pedestrians up to a maximum range of the sensor arrangement (e.g., 50, 100, or 200 meters). In particular embodiments, the LiDAR sensor array may be configured to detect trace gases or aerosol particles 154 in the atmosphere, in addition to detecting a temperature associated with a location or area (described in more detail below).

As another example, the autonomous vehicle 140 may have optical cameras pointing in different directions. The cameras may be used for, e.g., recognizing roads, lane markings, street signs, traffic lights, police, other vehicles, and any other visible objects of interest. To enable the vehicle 140 to "see" at night, infrared cameras may be installed. In particular embodiments, the vehicle may be equipped with stereo vision for, e.g., spotting hazards such as pedestrians or tree branches on the road. As another example, the vehicle 140 may have radars for, e.g., detecting other vehicles and/or hazards afar. Furthermore, the vehicle 140 may have ultrasound equipment for, e.g., parking and obstacle detection. In addition to sensors enabling the vehicle 140 to detect, measure, and understand the external world around it, the vehicle 140 may further be equipped with sensors for detecting and self-diagnosing the vehicle's own state and condition. For example, the vehicle 140 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 140 may build a 3D model of its surrounding based on data from its LiDAR, radar, sonar, and cameras, along with a pre-generated map obtained from the transportation management system 160 or the third-party system 170. Although sensors 144 appear in a particular location on autonomous vehicle 140 in FIG. 1, sensors 144 may be located in any suitable location in or on autonomous vehicle 140. Example locations for sensors include the front and rear bumpers, the doors, the front windshield, on the side panel, or any other suitable location.

In particular embodiments, the autonomous vehicle 140 may be equipped with a processing unit (e.g., one or more CPUs and GPUs), memory, and storage. The vehicle 140 may thus be equipped to perform a variety of computational and processing tasks, including processing the sensor data, extracting useful information, and operating accordingly. For example, based on images captured by its cameras and a machine-vision model, the vehicle 140 may identify particular types of objects captured by the images, such as pedestrians, other vehicles, lanes, curbs, and any other objects of interest.

In particular embodiments, the autonomous vehicle 140 may have a navigation system 146 responsible for safely navigating the autonomous vehicle 140. In particular embodiments, the navigation system 146 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 146 may also utilize, e.g., detected object data, trace gas and aerosol particle data, temperature information, map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 146 may use its determinations to control the vehicle 140 to operate in prescribed manners and to guide the autonomous vehicle 140 to its destinations without colliding into other objects. Although the physical embodiment of the navigation system 146 (e.g., the processing unit) appears in a particular location on autonomous vehicle 140 in FIG. 1, navigation system 146 may be located in any suitable location in or on autonomous vehicle 140. Example locations for navigation system 146 include inside the cabin or passenger compartment of autonomous vehicle 140, near the engine/battery, near the front seats, rear seats, or in any other suitable location.

In particular embodiments, the autonomous vehicle 140 may be equipped with a ride-service computing device 148, which may be a tablet or any other suitable device installed by transportation management system 160 to allow the user to interact with the autonomous vehicle 140, transportation management system 160, other users 101, or third-party systems 170. In particular embodiments, installation of ride-service computing device 148 may be accomplished by placing the ride-service computing device 148 inside autonomous vehicle 140, and configuring it to communicate with the vehicle 140 via a wire or wireless connection (e.g., via Bluetooth). Although FIG. 1 illustrates a single ride-service computing device 148 at a particular location in autonomous vehicle 140, autonomous vehicle 140 may include several ride-service computing devices 148 in several different locations within the vehicle. As an example and not by way of limitation, autonomous vehicle 140 may include four ride-service computing devices 148 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 148 may be detachable from any component of autonomous vehicle 140. This may allow users to handle ride-service computing device 148 in a manner consistent with other tablet computing devices. As an example and not by way of limitation, a user may move ride-service computing device 148 to any location in the cabin or passenger compartment of autonomous vehicle 140, may hold ride-service computing device 148, or handle ride-service computing device 148 in any other suitable manner. Although this disclosure describes providing a particular computing device in a particular manner, this disclosure contemplates providing any suitable computing device in any suitable manner.

Figure 2:
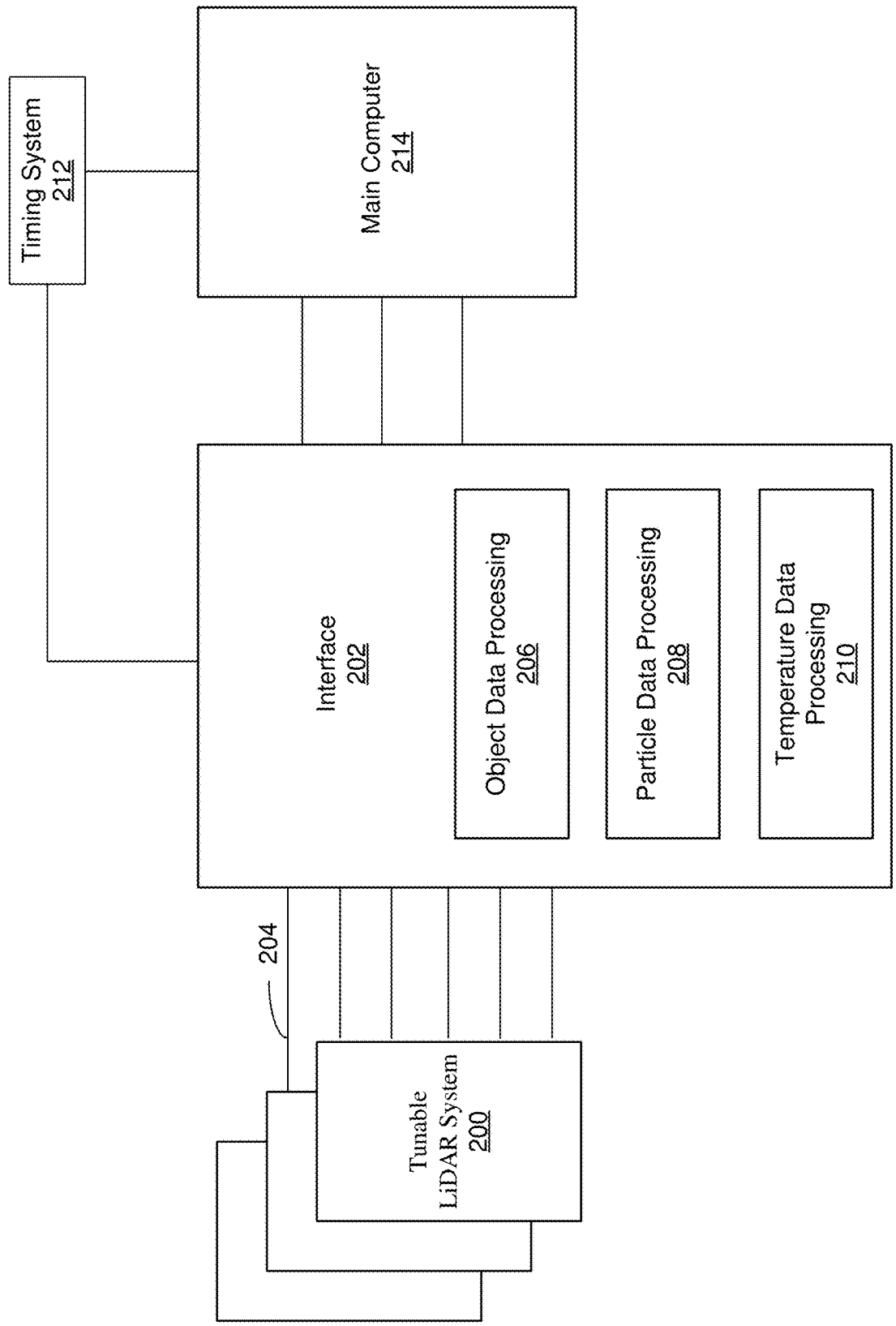
FIG. 2 illustrates an example schematic of a tunable LiDAR system.

FIG. 2 illustrates an example schematic of a tunable LiDAR system. As illustrated in the example of FIG. 2, one or more tunable LiDAR systems 200 may be connected to an interface 202 through a respective serial link 204. Interface 202 may be mounted inside the vehicle or outside the vehicle (e.g., on the roof) within the LiDAR sensor array 144, as described above. Further, the interface 202 may multiplex power, timing, and control data sent to one or more of the tunable LiDAR systems 200 and data received from the tunable LiDAR systems 200 via its serial link 204. In particular embodiments, the interface 202 may include object data processing 206, trace gas or aerosol particle data processing 208, and temperature data processing 210. Object data process 206 may process the object data received from the one or more tunable LiDAR systems 200 received via the serial link 204. Trace gas or aerosol particle data processing 208 may process the trace gas and aerosol particle data received from the one or more tunable LiDAR systems 200 received via the serial link 204. In addition, temperature data processing 210 may process the temperature information received from the one or more tunable LiDAR systems 200 received via the serial link 204.

In particular embodiments, a timing system 212 coupled to interface 202 may provide timing information for operating one or more light sources associated with each of the one or more tunable LiDAR systems 200 through serial link 204. Further, the timing system 212 is coupled to a main computer 214 of the vehicle 140 and may provide timestamp information of the object data, trace gas or particle data, and temperature data that is captured by the one or more tunable LiDAR systems 200. In particular embodiments, the main computer 214 of the vehicle 140 may interface with the outside world and control the overall function of the vehicle (e.g., in conjunction with transportation management system 160, as discussed above). Although this disclosure describes and illustrates a schematic of a tunable LiDAR system having a particular configuration of components, this disclosure contemplates any suitable tunable LiDAR system having any suitable configuration of components.

Figure 3:
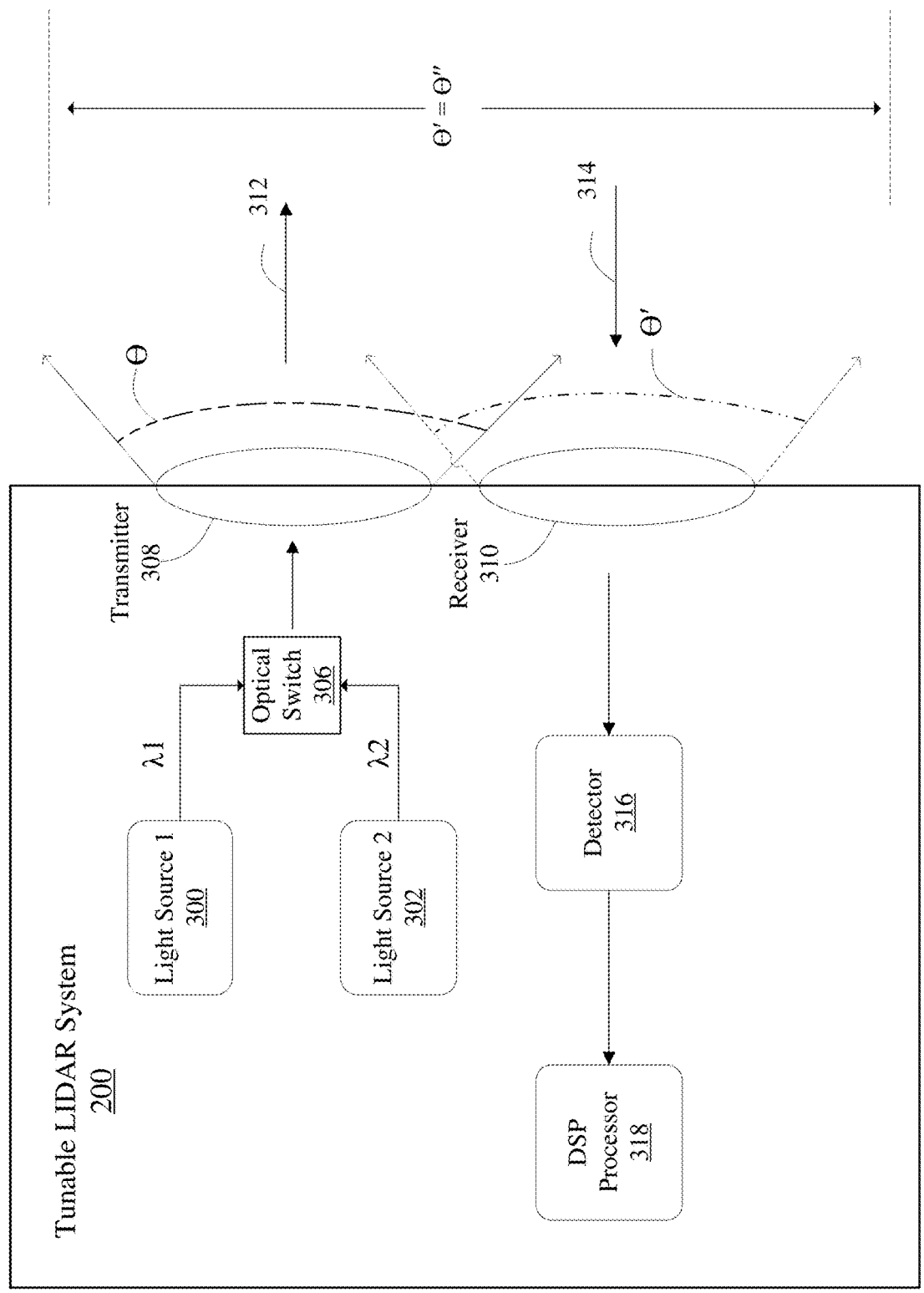
FIG. 3 illustrates example internal components of a tunable LiDAR system according to one embodiment described herein.

FIG. 3 illustrates example internal components of a tunable LiDAR system according to one embodiment described herein. In particular embodiments, as discussed above, a tunable LiDAR may include one or more lasers configured to measure a number density of various trace gases in the atmosphere for high resolution mapping of these trace gases. As an example and not by way of limitation, the tunable LiDAR system may include at least two lasers that are positioned in very close proximity to each other (e.g., with nanometers in length from each other) that use at least two different wavelengths in order measure a number density of various trace gases within a predetermined absorption spectrum from visible light (e.g., from about 390 nm to 700 nm) all the way to 2000 nm. As an example and not by way of limitation, trace gases of interest include methane ($CH_4$), water vapor, carbon dioxide ($CO_2$), nitrous oxide ($N_2O$), and any other relevant trace gases. In particular embodiments, this LiDAR system may be "tunable" or selectable for one or more of the various trace gases (e.g., selectable between detecting methane or water vapor). As an example and not by way of limitation, the driver and/or passenger may select the one or more trace gases to measure, such as selecting to measure methane gas on a smoggy day so as to bypass areas that have a potentially hazardous amount of methane gas. As another example and not by way of limitation, the autonomous vehicle may select the one or more trace gases to measure, such as selecting water vapor on a particularly humid day in order to bypass areas that have an especially high measure of water vapor content in the air and thus especially humid in the situation where there are small children in the car on an extended trip.

In particular embodiments, a tunable LiDAR system may include multiple transmitters for transmitting multiple wavelengths. As illustrated in the example of FIG. 3, tunable LiDAR system 200 includes a first light source 300 and a second light source 302. Light sources 300, 302 may be infrared light sources, laser light sources, other suitable light sources, or any combination thereof. Light source 300 may transmit a light beam at a wavelength $\lambda 1$, and light source 302 may transmit a light beam at a wavelength $\lambda 2$. Light sources 300, 302 may each direct one or more light beams at wavelengths of $\lambda 1$ and $\lambda 2$, respectively, through an optical switch 306, which may switch between first light source 300 and second light source 302 in order to trigger them at the same time, or at different times (e.g., with a time period offset as dictated by timing system 212). Light sources 300 and 302 may each direct one or more light beams at wavelengths of $\lambda 1$ and $\lambda 2$, respectively, to a combined light beam 312 that is directed through a transmitter 308 to the environment surrounding the vehicle.

One or more return light beams 314 may be received by a receiver 310 and detected by a detector 316 (e.g., a photodetector). Then, the received signals from the return light beams 314 may be sent to a DSP processor 318 for processing to determine a number density of a trace gas or aerosol particle. In particular embodiments, light sources 300 and 302 may be positioned in very close proximity to each other (e.g., with a few nanometers distance from each other) such that the backscatter coefficients for the wavelength associated with light source 300 and the wavelength associated with light source 302 are almost identical to each other. In addition, the two wavelengths $\lambda 1$ and $\lambda 2$ are selected based on the particular trace gas or aerosol particle to be detected. As an example and not by way of limitation, light source 300 transmitting the light beam at wavelength $\lambda 1$ may be tuned to an absorption band of a particular trace gas of interest (e.g., methane), while light source 302 transmitting the light beam at wavelength $\lambda 2$ may be tuned to a different wavelength (e.g., a wavelength that experiences much less absorption compared to the wavelength of the light source 300), so that an average number density of the particular trace gas may be calculated by comparing the receive light beams received at receiver 310.

In particular embodiments, the number density of the trace gas may be determined based on spectroscopy measurements. As shown in FIG. 3, two light sources 300, 302 located in close proximity in location to each other are associated with an absorption band of the trace gas of interest and an absorption band not associated with the trace gas of interest. To estimate the absorption variable α(abs), we start with the LiDAR equations shown below:

$$N_s(\lambda, r) = \frac{P_L(\lambda)\Delta t}{hc l\lambda}[\beta(\lambda, r)]\frac{A}{r^2}T(\lambda, r)v(\lambda)G(r) + N_B, \quad \text{EQUATION 1}$$

where $$T(\lambda, r) = \exp\left[-2\int_0^r \alpha(l, r)dr\right].$$

For an accurate measurement of α(abs), α(sc) should be cancelled out when performing $$\frac{N_s 2}{N_s 1},$$

where $N_s 1$ is the number of photons detected for the first laser (e.g., light source 300) and $N_s 2$ is the number of the photons detected for the second laser (e.g., light source 302). In these equations, T accounts for both scattering and absorption, where α=α(abs)+α(sc). If the two laser wavelengths are very close to each other in wavelength, α(sc) is almost identical for both wavelengths. Then, the gas number density (i.e., concentration) can be estimated from α(abs).

In particular embodiments, returning to FIG. 3, transmitter 308 has an associated field of view Θ and receiver 310 has an associated field of view Θ'. Field of view Θ for transmitter 308 may completely overlap field of view Θ' for receiver 310 such that transmitter 308 and receiver 310 share the same field of view Θ and Θ', which are equal to each other and correspond to the same field of view, as shown in FIG. 3. In other words, the combined light beam 312 (including one or more light beams from light sources 300, 302) is directed, and received light beams 314 are received, from a same field of view Θ/Θ'.

In particular embodiments, the tunable LiDAR allows for selection of particular trace gases or aerosol particles for detecting and determine an average number density by changing the wavelengths of the light sources based on what trace gas or aerosol particle is being identified. Moreover, the additional capabilities of determining the number density of a trace gas or aerosol particle does not affect the object detect capabilities of the LiDAR system. Once specific number densities of particular trace gas or aerosol particle information is determined, this information may be used in conjunction with GPS and local map information in order to generate a geographic map with trace gas and aerosol particle data for some or all of the streets in an area, which is discussed in more detail below with regard to FIG. 5.

Figure 4:
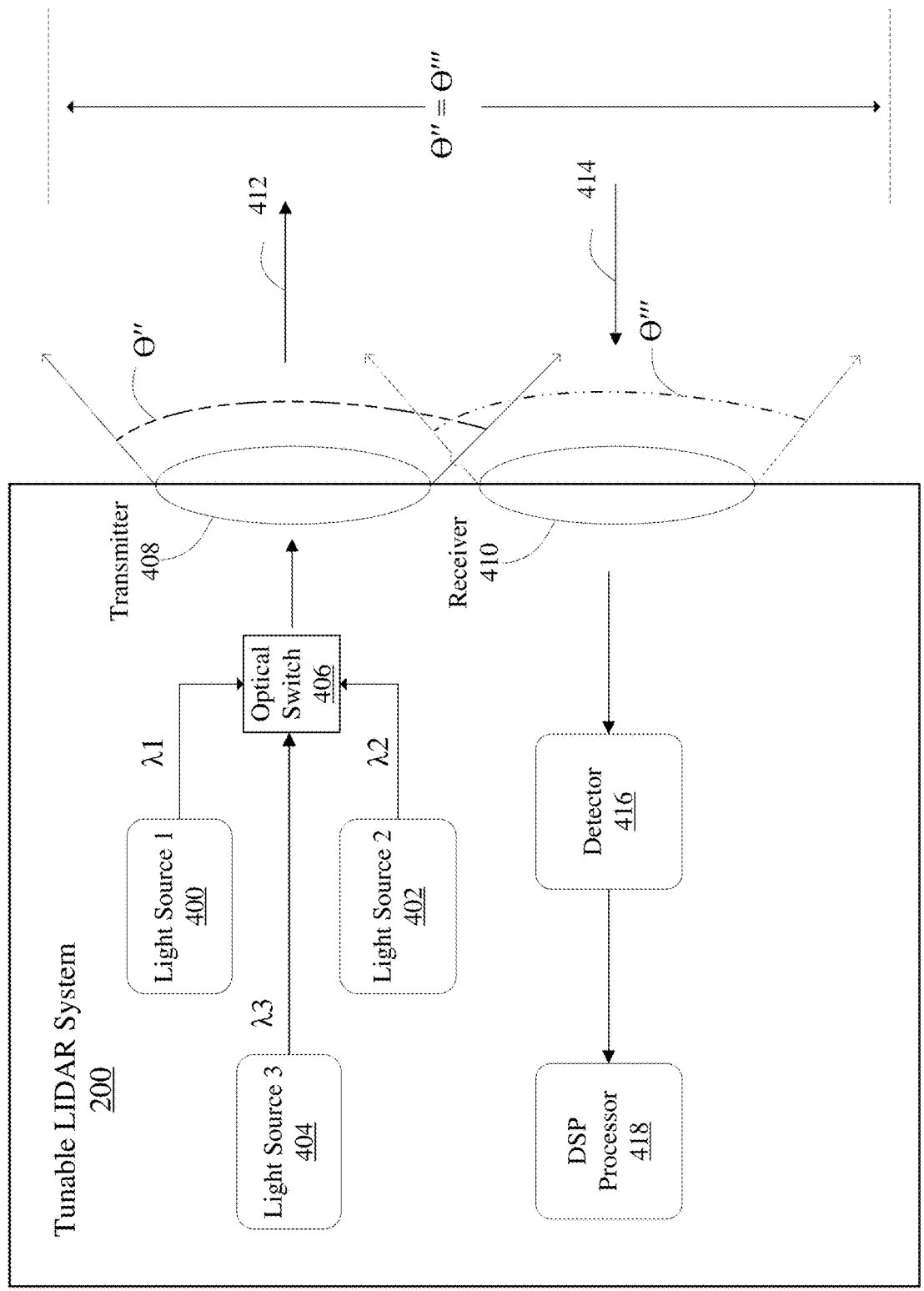
FIG. 4 illustrates example internal components of a tunable LiDAR system with temperature sensor according to another embodiment described herein.

FIG. 4 illustrates example internal components of a tunable LiDAR system with temperature sensor according to another embodiment described herein. In particular embodiments, tunable LiDAR system 200 may be further modified to include a third light source that transmits light at a third wavelength in order to detect temperature. As discussed above, absorption of light is a function of the density of molecules in the air and also the temperature of the air, and thus adding a third light source to the configuration illustrated in FIG. 3 may result in tunable LiDAR system 200 that can simultaneous conduct object detection, trace gas and aerosol particle detection, and also temperature sensing.

In particular embodiments, as discussed above, the tunable LiDAR system may detect and characterize the aerosol particles or trace gases by characterizing the reflected power from the aerosol particles or trace gases. As an example and not by way of limitation, a tunable LiDAR may have a plurality of lasers set to three wavelengths that are all different from each other. A set of two to three wavelengths are selected that are far away from each other in wavelength and none fall in any absorption spectra of any of the trace gases in the atmosphere. Using Equation 1 shown above, by measuring $N_x/N_y$, where $N_x$ is the number of detected photons by laser x (e.g., one of the plurality of lasers), the particle size of the aerosol particles responsible for pollution in the air may be characterized.

FIG. 4 illustrates a similar configuration as FIG. 3 with the addition of a third light source 404. As illustrated in the example of FIG. 4, first light source 400, second light source 402, and third light source 404 are all connected to optical switch 406. First light source 400 may transmit a light beam at a wavelength λ1, and second light source 402 may transmit a light beam at a wavelength λ2, and third light source 404 may transmit a light beam at a wavelength λ3. Light sources 400, 402, 404 may each direct one or more light beams at wavelengths of λ1, λ2, λ3, respectively, through optical switch 406, which may switch between first, second, and third light sources 400, 402, 404 in order to trigger them at the same time, or at different times (e.g., with a time period offset as dictated by timing system 212). Light sources 400, 402, 404 may each direct one or more light beams at wavelengths of λ1, λ2, λ3, respectively, to a combined light beam 412 that is directed through a transmitter 408 to the environment surrounding the vehicle.

One or more return light beams 414 may be received by a receiver 410 and detected by a detector 416 (e.g., a photodetector). Then, the received signals from the return light beams 414 may be sent to a DSP processor 418 for processing to determine a number density of a trace gas or aerosol particle and a temperature measurement. In particular embodiments, similar to the embodiment of FIG. 3, transmitter 408 has an associated field of view Θ" and receiver 410 has an associated field of view Θ'". Field of view Θ" for transmitter 408 may completely overlap field of view Θ'" for receiver 410 such that transmitter 408 and receiver 410 share the same field of view Θ" and Θ'", which are equal to each other and correspond to the same field of view, as shown in FIG. 4. In other words, the combined light beam 412 (including one or more light beams from light sources 400, 402, 404) is directed, and received light beams 414 are received, from a same field of view Θ"/Θ'".

In particular embodiments, the addition of the third light source 404 transmitting a light beam at a wavelength λ3 is for the purpose of measuring a temperature, and may be used to generate a temperature map with temperature data for some of all the streets in a geographic area which is discussed in more detail below with regard to FIG. 5. In addition, as discussed above, this detection of temperature may also help improve object detection due to the effect of temperature on the reflectivity of an object. The tunable LiDAR system may be able to use the temperature information to calibrate the reflectivity of the object in order to better detect and identify the object. As an example and not by way of limitation, if the tunable LiDAR system detects an object that may be categorized as an inanimate object or a human being, the LiDAR system may use the temperature measurement to determined that the object is an inanimate object because the temperature of the object is detected to be the same as the ambient air temperature. Although this disclosure describes and illustrates a tunable LiDAR system having a particular configuration of components, this disclosure contemplates any suitable tunable LiDAR system having any suitable configuration of components.

Figure 5:
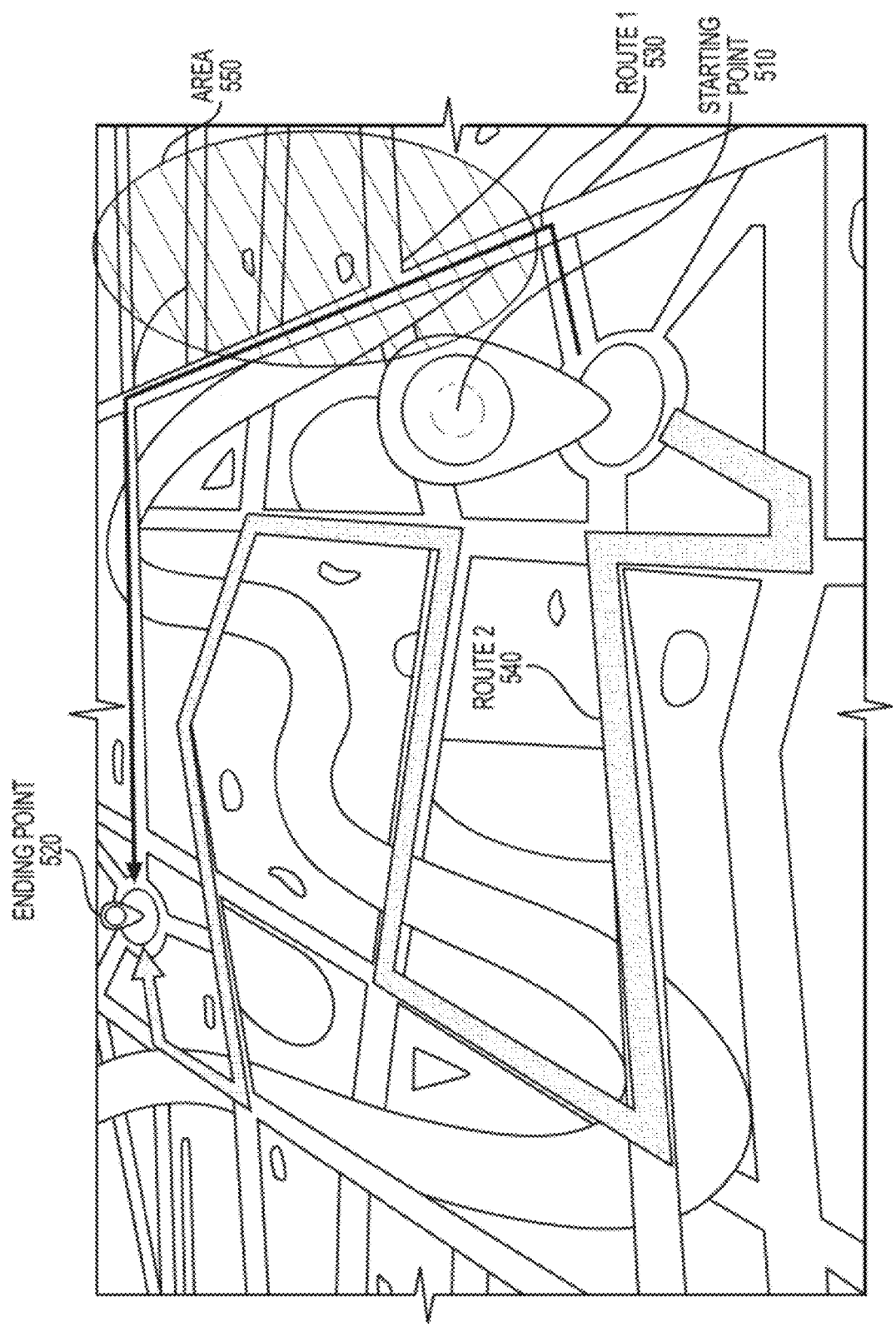
FIG. 5 illustrates an example vehicle navigation map generated based on aerosol information received from the tunable LiDAR system.

FIG. 5 illustrates an example vehicle navigation map generated based on aerosol and/or temperature information received from the tunable LiDAR system. As discussed above, in the context of manually-driven vehicles, the trace gas and aerosol particle mapping may be useful in detecting a variety of trace gases and aerosol particles and then providing the driver with information on air quality and potentially-annoying (e.g., smog that causes coughing) or potentially-hazardous situations (e.g., pollution aerosol particles that may trigger an acute respiratory attack or illness) that the driver may want to avoid. As an example, if information is available regarding smog or other atmospheric pollutants along a travel route, the driver of the vehicle may want to take an alternative route to bypass the smog and atmospheric pollutants. Also discussed above, in the context of autonomous vehicles, the trace gas and aerosol particle mapping may be useful for detecting a variety of trace gases and aerosol particles, and then the autonomous vehicle may use this information to automatically update or revise a selected route based on any potentially-hazardous situations that the driver/passenger may want to avoid. In addition, a fleet of autonomous vehicles may be used to for the detection process. As illustrated in FIG. 1 and discussed above, transportation management system 160 may store and access ride information, which may include GPS information, locations related to the ride (e.g., a starting location and an ending location), traffic data, route options, trace gas and aerosol particle information, temperature information, or any other suitable information associated with a ride. In particular embodiments, this ride information may be collected from a single vehicle, or from a fleet of vehicles. As an example and not by way of limitation, when a fleet of vehicles is used to collect this ride information, different vehicles of the fleet may be used for detecting different trace gases and aerosol particles in a particular area (e.g., different vehicles traveling in the same area may be tuned to different wavelengths for detecting different trace gases and aerosol particles) in order to collect the most information on a wide variety of gas and aerosol particles in the area. Moreover, after various trace gases and aerosol particles are detected by the fleet of vehicles, this information may then be shared by transportation management system 160 between all the vehicles in the fleet so that routing decisions for any vehicle schedule to travel within the affected area may be updated based on the detection of particular trace gases and aerosol particles (e.g., harmful pollution).

As an example and not by way of limitation, a vehicle (e.g., an autonomous vehicle) may obtain ride information from transportation management system 160 for determining that a particular geographic location has a high concentration of hazardous gases (e.g., methane gas), and may revise a travel route based on this information. As shown in FIG. 5, the vehicle navigation map generated based on aerosol information received from the tunable LiDAR system includes a starting point 510, an ending point 520, a first possible route 530, a second possible route 540, and an area 550. In this situation, the tunable LiDAR system may determine that area 550 has a hazardous concentration of methane gas, and thus may revise the route from the first route 530, which is faster and more direct, to the second 540, which is more circuitous but safer and/or more comfortable based on trace gas and aerosol particle levels.

As another example and not by way of limitation, a vehicle (e.g., an autonomous vehicle or a human-driven vehicle) may obtain ride information from transportation management system 160 for determining that the temperature of a particular geographic area indicates that it is getting a lot of sun and may be advantageous for charging a solar batter of the vehicle. Again, as shown in FIG. 5, the vehicle navigation map generated based on temperature information received from the tunable LiDAR system includes a starting point 510, an ending point 520, a first possible route 530, a second possible route 540, and an area 550. In this situation of a solar-powered vehicle, the tunable LiDAR system may determine that area 550 has had high cloud cover in comparison with the surrounding areas that have lower cloud cover, and thus may revise the route from the first route 530, which is faster and more direct, to the second 530, which is more circuitous but has access to more sun so that solar-powered vehicle has been time and traverses more sunny areas to maximize the recharging of the vehicle battery.

Figure 6:
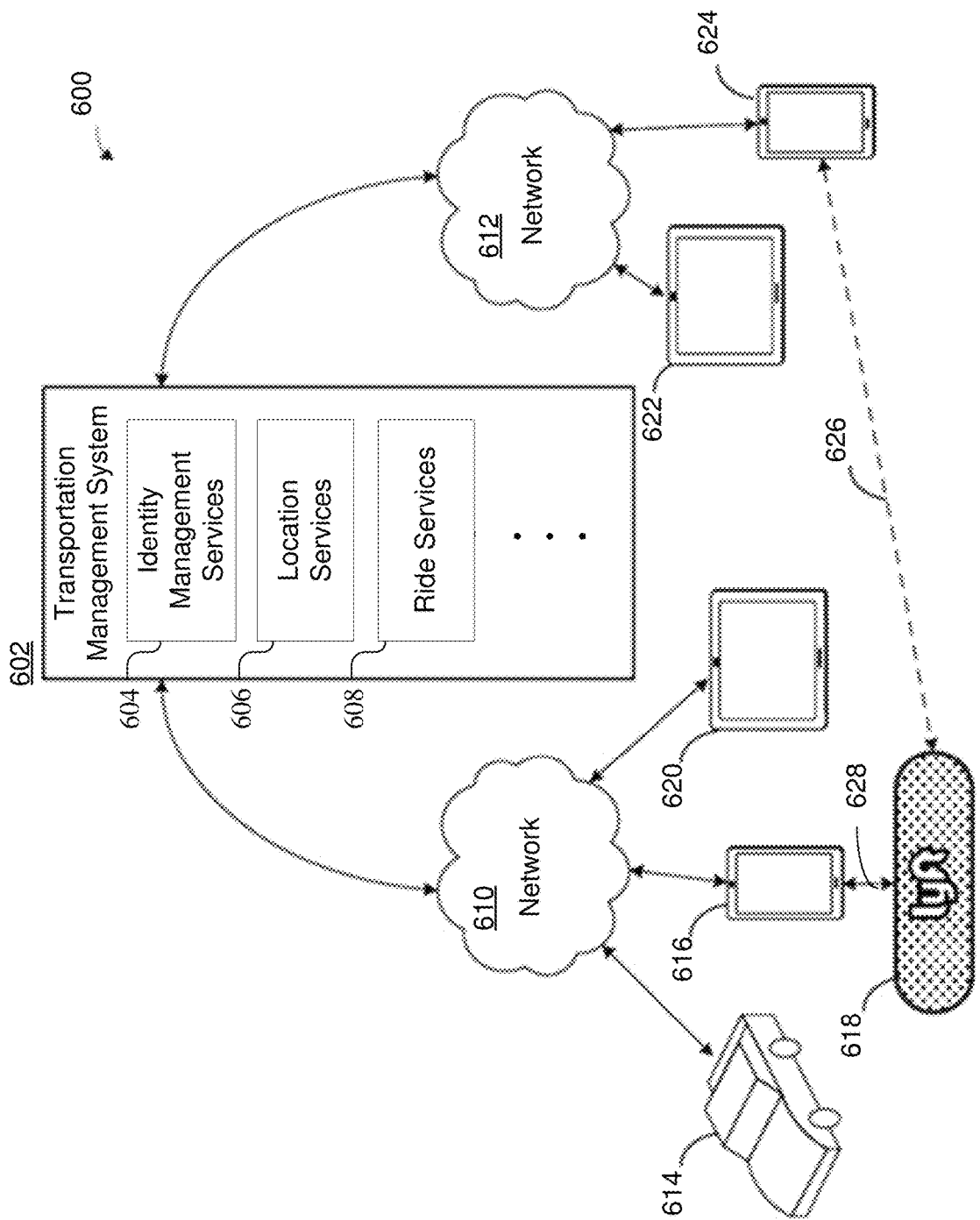
FIG. 6 illustrates an example block diagram of a transportation management environment.

FIG. 6 shows a transportation management environment 600, in accordance with particular embodiments. For example, a transportation management system 602 executing on one or more servers or distributed systems may be configured to provide various services to ride requestors and providers. In particular embodiments, the transportation management system 602 may include software modules or applications, including, e.g., identity management services 604, location services 606, ride services 608, and/or any other suitable services. Although a particular number of services are shown as being provided by system 602, more or fewer services may be provided in various embodiments. In addition, although these services are shown as being provided by the system 602, all or a portion of any of the services may be processed in a distributed fashion. For example, computations associated with a service task may be performed by a combination of the transportation management system 602 (including any number of servers, databases, etc.), one or more devices associated with the provider (e.g., devices integrated with the managed vehicles 614, provider's computing devices 616 and tablets 620, and transportation management vehicle devices 618), and/or one or more devices associated with the ride requestor (e.g., the requestor's computing devices 624 and tablets 622). In particular embodiments, the transportation management system 602 may include one or more general purpose computers, server computers, distributed computing systems, clustered computing systems, cloud-based computing systems, or any other computing systems or arrangements of computing systems. The transportation management system 602 may be configured to run any or all of the services and/or software applications described herein. In particular embodiments, the transportation management system 602 may include an appropriate operating system as well as various server applications, such as web servers capable of handling hypertext transport protocol (HTTP) requests, file transfer protocol (FTP) servers, database servers, etc.

In particular embodiments, identity management services 604 may be configured to, e.g., perform authorization services for requestors and providers and manage their interactions and data with the transportation management system 602. This may include, e.g., authenticating the identity of providers and determining that they are authorized to provide services through the transportation management system 602. Similarly, requestors' identities may be authenticated to determine whether they are authorized to receive the requested services through the transportation management system 602. Identity management services 604 may also manage and control access to provider and requestor data maintained by the transportation management system 602, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 604 may also manage and control access to provider/requestor data stored with and/or obtained from third-party systems. For example, a requester or provider may grant the transportation management system 602 access to a third-party email, calendar, or task management system (e.g., via the user's credentials). As another example, a requestor or provider may grant, through a mobile device (e.g., 616, 620, 622, and 624), a transportation application associated with the transportation management system 602 access to data provided by other applications installed on the mobile device. Such data may be processed on the client and/or uploaded to the transportation management system 602 for processing, if so desired.

In particular embodiments, the transportation management system 602 may provide location services 606, which may include navigation and/or traffic management services and user interfaces. For example, the location services 606 may be responsible for querying devices associated with the provider (e.g., vehicle 614, computing device 616, tablet 620, transportation management vehicle device 618) and the requester (e.g., computing device 624 and tablet 622) for their locations. The location services 606 may also be configured to track those devices to determine their relative proximities, generate relevant alerts (e.g., proximity is within a threshold distance), generate navigation recommendations, and any other location-based services.

In particular embodiments, the transportation management system 602 may provide ride services 608, which may include ride matching and management services to connect a requestor to a provider. For example, after the identity of a ride requestor has been authenticated by the identity management services module 604, the ride services module 608 may attempt to match the requestor with one or more ride providers. In particular embodiments, the ride services module 608 may identify an appropriate provider using location data obtained from the location services module 606. The ride services module 608 may use the location data to identify providers who are geographically close to the requestor (e.g., within a certain threshold distance or travel time) and further identify those who are a good match with the requestor. The ride services module 608 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 608 may use rule-based algorithms or machine-learning models for matching requestors and providers.

The transportation management system 602 may communicatively connect to various devices through networks 610 and 612. Networks 610, 612 may include any combination of interconnected networks configured to send and/or receive data communications using various communication protocols and transmission technologies. In particular embodiments, networks 610, 612 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 610, 612 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 610, 612 may each include any combination of networks described herein or known to one of ordinary skill in the art.

In particular embodiments, devices within a vehicle may be interconnected. For example, any combination of the following may be communicatively connected: vehicle 614, provider computing device 616, provider tablet 620, transportation management vehicle device 618, requestor computing device 624, requestor tablet 622, and any other device (e.g., smart watch, smart tags, etc.). For example, the transportation management vehicle device 618 may be communicatively connected to the provider computing device 616 and/or the requestor computing device 624. The transportation management vehicle device 618 may connect 626, 628 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 602 using applications executing on their respective computing devices (e.g., 614, 616, 618, and/or 620), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 614 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 602. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 7:
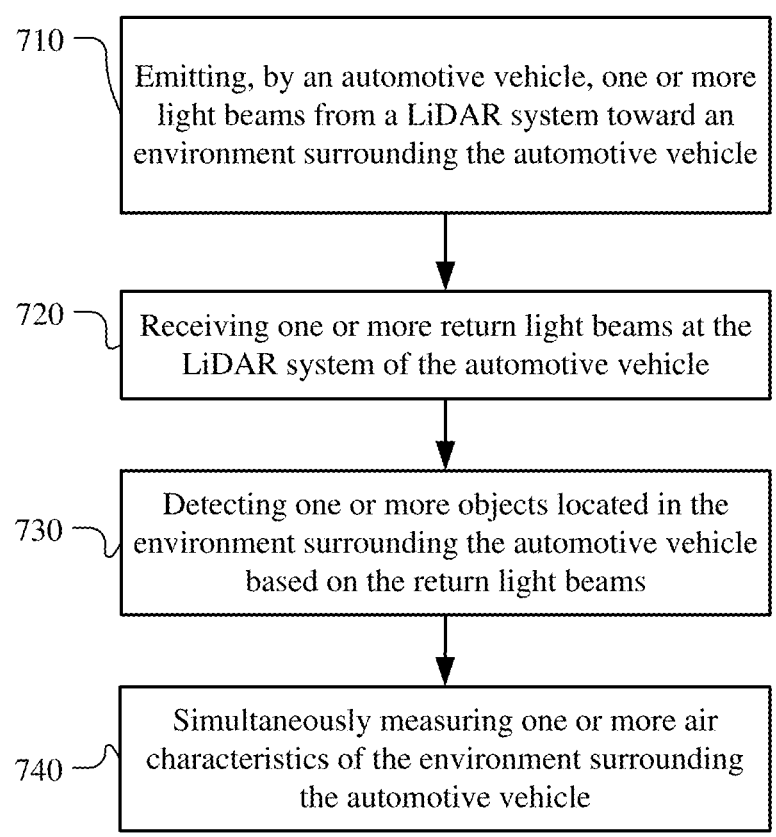
FIG. 7 illustrates an example method for using a tunable LiDAR system for object, aerosol particle, and temperature detection.

FIG. 7 illustrates an example method 700 for using a tunable LiDAR system for object, trace gas and aerosol particle, and temperature detection. The method may begin at step 710, where a LiDAR system may emit, by an automotive vehicle, one or more light beams toward an environment surrounding the automotive vehicle. At step 720, the LiDAR system may receive one or more return light beams at the LiDAR system of the automotive vehicle. At step 730, the LiDAR system may detect one or more objects located in the environment surrounding the automotive vehicle based on the return light beams. At step 740, the LiDAR system may simultaneous measuring one or more air characteristics of the environment surrounding the automotive vehicle. In particular embodiments, the simultaneous detecting of the one or more objects and measuring of the one or more air characteristics is performed by the LiDAR system. The one or more air characteristics measured may include characteristics of one or more trace gases or characteristics of one or more aerosol particles in the air surrounding the automotive vehicle. In particular, the measuring of the characteristics of the trace gases may include measuring a presence or density of the trace gases, and the measuring of the characteristics of the aerosol particles may include measuring a size, density, or type of particles of the aerosol particles. In particular embodiments, the LiDAR system may be tuned to measure the characteristics of one or more trace gases or the characteristics of the one or more aerosol particles by emitting one or more light beams at one or more wavelengths associated with each of the trace gases and aerosol particles. In particular embodiments, the method may further include sending, by the automotive vehicle, location information to a server associated with vehicle navigation, and sending information of the detected objects and measured air characteristics to the server associated with vehicle navigation, the server configured to update a vehicle-navigation map based on the information.

The measuring of the characteristics of the aerosol particles may include measuring a size, density, or type of particles of the aerosol particles. In particular embodiments, the light beams from the LiDAR system are tuned to detect the presence or density of the trace gases and the one or more characteristics of the aerosol particles by emitting one or more light beams of one or more wavelengths associated with each of the trace gases and aerosol particles.

In particular embodiments, the light beams from the LiDAR system may be tuned to detect the measurement associated with the trace gas or aerosol particle. In particular embodiments, the measurement associated with the trace gas or aerosol particle may include a number density of the trace gas or aerosol particle determined based on the return light beams. As discussed above, the tunable LiDAR system may be "tuned" to detect the number density of particular trace gases or aerosol particles (e.g., methane, air vapor, etc.) by adjusting the wavelength of one or more of the light sources.

In particular embodiments, the LiDAR system may collect one or more measurements of the trace gas or aerosol particle for a particular geographic area and generate a trace gas and aerosol particle map for the particular geographic area based on the collected measurements. In addition, the LiDAR system may further access a vehicle navigation map for the particular geographic area based on a current location of a vehicle, the current location of the vehicle being located within the particular geographic area, and the LiDAR system being place at a position on the vehicle for object detection, determine a starting location and an ending location for the vehicle based one or more of driver information or passenger information, and generate an optimal route for the vehicle from the starting location to the ending location based on the vehicle navigation map and the trace gas and aerosol particle map. As discussed above in relation to FIG. 5, a vehicle with the tunable LiDAR system may incorporate the trace gas or aerosol particle information into a vehicle navigation map in order to navigate around hazardous concentrations of detected trace gases or aerosol particles (e.g., methane gas).

In particular embodiments, the LiDAR system may emit at least two light beams of different wavelengths toward the object, which may be helpful in calculating the average number density of a trace gas or aerosol particle. The LiDAR system may also emit at least three light beams of different wavelengths toward the object such that the third light beam emitted by the LiDAR system toward the object is to determine a temperature associated with the object or an area surrounding the object. This temperature measurement may be used to generate a temperature map for the particular geographic area, which may be combined with the trace gas and aerosol particle map and used to generate an optimal route for the vehicle from the starting location to the ending location. As discussed above, the temperature map may be useful to determining how to route a vehicle through hazardous, or alternatively, beneficial temperature conditions. In addition, this detection of temperature may also help improve object detection due to the effect of temperature on the reflectivity of an object. As discussed above, the LiDAR system may be able to use the temperature information to calibrate the reflectivity of the object in order to better detect and identify the object.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for using a tunable LiDAR system for object, trace gas and aerosol particle, and temperature detection including the particular steps of the method of FIG. 7, this disclosure contemplates any suitable method for using a tunable LiDAR system for object, trace gas and aerosol particle, and temperature detection including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
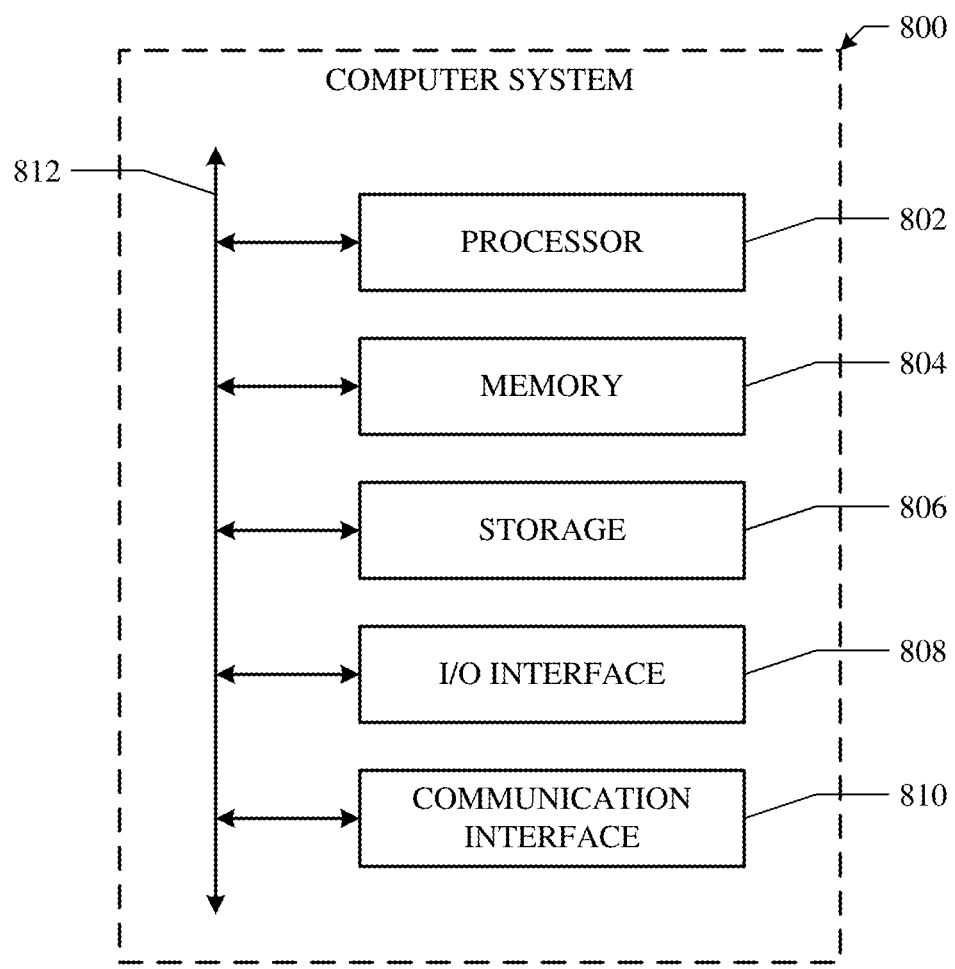
FIG. 8 illustrates an example of a computing system.

FIG. 8 illustrates an example computer system 800. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a fleet management system managing a plurality of collectively-managed vehicles within a geographic area:

selecting (i) a first wavelength at which one or more light beams is to be emitted from a first light detection and ranging (LiDAR) system associated with a first vehicle in the geographic area, and (ii) a second wavelength at which one or more light beams is to be emitted from a second LiDAR system associated with a second vehicle in the geographic area, wherein the selected first wavelength is different than the selected second wavelength;

causing the one or more light beams to be emitted at the selected first and second wavelengths from the first and second LiDAR systems towards an environment including one or more objects external to the first and second vehicles;

determining one or more return light beams received via each of the first and second LiDAR systems, the one or more return light beams corresponding to reflections of the one or more emitted light beams by the one or more objects;

detecting at least one object of the one or more objects located in the environment external to the first and second vehicles based on the one or more return light beams;

measuring one or more air characteristics of the environment external to the first and second vehicles based on the one or more return light beams corresponding to the reflections of the one or more light beams emitted at the selected first and second wavelengths;

receiving measurements of the one or more air characteristics of the environment external to the first and second vehicles of the plurality of collectively-managed vehicles within the geographic area;

determining updated routing information for the first and second vehicles based on the received measurements; and causing instructions for navigating the first and second vehicles based on the updated routing information of the geographic area to be transmitted to the first and second vehicles.

2. The method of claim 1, wherein the first and second LiDAR systems are used in the detecting of the at least one object of the one or more objects and the measuring of the one or more air characteristics.

3. The method of claim 1, wherein the one or more air characteristics measured comprises characteristics of one or more trace gases or characteristics of one or more aerosol particles in an air surrounding the first and second vehicles.

4. The method of claim 3, wherein the measuring of the characteristics of the one or more trace gases comprises measuring a presence or density of the one or more trace gases.

5. The method of claim 3, wherein the measuring of the characteristics of the one or more aerosol particles comprises measuring a size, density, or type of particles of the aerosol particles.

6. The method of claim 3, wherein the first and second LiDAR systems are tuned to measure the characteristics of the one or more trace gases or the characteristics of the one or more aerosol particles by emitting one or more light beams at one or more wavelengths associated with each of the trace gases and aerosol particles.

7. The method of claim 6, wherein two light beams of different wavelengths are emitted by each of the first and second LiDAR systems toward the environment external to the first and second vehicles, and wherein a first light beam of the two light beams is within an absorption band associated with one of the trace gases or aerosol particles.

8. The method of claim 7, wherein the two light beams are disposed in close proximity to each other within each of the first and second LiDAR systems such that a backscatter coefficient for a wavelength associated with the first light beam is approximately identical to a backscatter coefficient for a wavelength associated with a second light beam of the two light beams.

9. The method of claim 6, wherein three light beams of different wavelengths are emitted by at least one of the first and second LiDAR systems toward the environment external to the vehicle, and wherein at least one of the three light beams is emitted by the at least one of the first and second LiDAR systems to determine a temperature associated with the at least one object of the one or more objects or an area surrounding the at least one object of the one or more objects.

10. The method of claim 1, further comprising:

receiving information of the detected at least one object in the environment external to the first and second vehicles of the plurality of collectively-managed vehicles within the geographic area;

determining further updated routing information for the first and second vehicles based on the received information; and causing instructions for navigating the first and second vehicles based on the further updated routing information of the geographic area to be transmitted to the first and second vehicles.

11. A fleet management system managing a plurality of collectively-managed vehicles within a geographic area, the system comprising: one or more processors and one or more computer-readable non-transitory storage media in communication with the one or more processors, the one or more computer-readable non-transitory storage media comprising instructions that when executed by the one or more of the processors, cause the system to perform operations comprising:

selecting (i) a first wavelength at which one or more light beams is to be emitted from a first light detection and ranging (LiDAR) system associated with a first vehicle in the geographic area, and (ii) a second wavelength at which one or more light beams is to be emitted from a second LiDAR system associated with a second vehicle in the geographic area, wherein the selected first wavelength is different than the selected second wavelength;

causing the one or more light beams to be emitted at the selected first and second wavelengths from the first and second LiDAR systems towards an environment including one or more objects external to the first and second vehicles;

determining one or more return light beams received via each of the first and second LiDAR systems, the one or more return light beams corresponding to reflections of the one or more emitted light beams by the one or more objects;

detecting at least one object of the one or more objects located in the environment external to the first and second vehicles based on the one or more return light beams;

measuring one or more air characteristics of the environment external to the first and second vehicles based on the one or more return light beams corresponding to the reflections of the one or more light beams emitted at the selected first and second wavelengths;

receiving measurements of the one or more air characteristics of the environment external to the first and second vehicles of the plurality of collectively-managed vehicles within the geographic area;

determining updated routing information for the first and second vehicles based on the received measurements; and causing instructions for navigating the first and second vehicles based on the updated routing information of the geographic area to be transmitted to the first and second vehicles.

12. The system of claim 11, wherein the first and second LiDAR systems are used in the detecting of the at least one object of the one or more objects and the measuring of the one or more air characteristics.

13. The system of claim 11, wherein the one or more air characteristics measured comprises characteristics of one or more trace gases or characteristics of one or more aerosol particles in an air surrounding the first and second vehicles.

14. The system of claim 13, wherein the first and second LiDAR systems are tuned to measure the characteristics of the one or more trace gases or the characteristics of the one or more aerosol particles by emitting one or more light beams at one or more wavelengths associated with each of the trace gases and aerosol particles.

15. The system of claim 11, wherein the operations further comprise:
receiving information of the detected at least one object in the environment external to the first and second vehicles of the plurality of collectively-managed vehicles within the geographic area;
determining further updated routing information for the first and second vehicles based on the received information; and
causing instructions for navigating the first and second vehicles based on the further updated routing information of the geographic area to be transmitted to the first and second vehicles.

16. One or more computer-readable non-transitory storage media embodying instructions that are operable when executed by a fleet management system managing a plurality of collectively-managed vehicles within a geographic area to cause one or more processors to perform operations comprising:
selecting (i) a first wavelength at which one or more light beams is to be emitted from a first light detection and ranging (LiDAR) system associated with a first vehicle in the geographic area, and (ii) a second wavelength at which one or more light beams is to be emitted from a second LiDAR system associated with a second vehicle in the geographic area, wherein the selected first wavelength is different than the selected second wavelength;
causing the one or more light beams to be emitted at the selected first and second wavelengths from the first and second LiDAR systems towards an environment including one or more objects surrounding external to the first and second vehicles;
determining one or more return light beams received via each of the first and second LiDAR systems, the one or more return light beams corresponding to reflections of the one or more emitted light beams by the one or more objects;
detecting at least one object of the one or more objects located in the environment external to the first and second vehicles based on the one or more return light beams;
measuring one or more air characteristics of the environment external to the first and second vehicles based on the one or more return light beams corresponding to the reflections of the one or more light beams emitted at the selected first and second wavelengths;
receiving measurements of the one or more air characteristics of the environment external to the first and second vehicles of the plurality of collectively-managed vehicles within the geographic area;
determining updated routing information for the first and second vehicles based on the received measurements; and
causing instructions for navigating the first and second vehicles based on the updated routing information of the geographic area to be transmitted to the first and second vehicles.

17. The one or more computer-readable non-transitory storage media of claim 16, wherein the first and second LiDAR systems are used in the detecting of the at least one object of the one or more objects and the measuring of the one or more air characteristics.

18. The one or more computer-readable non-transitory storage media of claim 16, wherein the one or more air characteristics measured comprises characteristics of one or more trace gases or characteristics of one or more aerosol particles in an air surrounding the first and second vehicles.

19. The one or more computer-readable non-transitory storage media of claim 18, wherein the first and second LiDAR systems are tuned to measure the characteristics of the one or more trace gases or the characteristics of the one or more aerosol particles by emitting one or more light beams at one or more wavelengths associated with each of the trace gases and aerosol particles.

20. The one or more computer-readable non-transitory storage media of claim 16, wherein the operations further comprise:
receiving information of the detected at least one object in the environment external to the first and second vehicles of the plurality of collectively-managed vehicles within the geographic area;
determining further updated routing information for the first and second vehicles based on the received information; and
causing instructions for navigating the first and second vehicles based on the further updated routing information of the geographic area to be transmitted to the first and second vehicles.

* * * * *